June 16, 1964 N. J. ANDERSON 3,137,822

APPARATUS FOR ACHIEVING SYMMETRICAL RESPONSE
AND SIMPLE TIME CHARACTERISTIC

Filed Jan. 31, 1958

INVENTOR.
Norman J. Anderson
BY
Morgan, Finnegan, Durham & Pine

United States Patent Office 3,137,822

Patented June 16, 1964

3,137,822

APPARATUS FOR ACHIEVING SYMMETRICAL RESPONSE AND SIMPLE TIME CHARACTERISTIC

Norman J. Anderson, 152 Fairview Ave., Boonton, N.J.

Filed Jan. 31, 1958, Ser. No. 712,423
12 Claims. (Cl. 329—204)

This invention relates to a class of circuits which perform detection and demodulation functions and is particularly related to circuits of this type which have a simple time constant and symmetrical response. The method for achieving these characteristics based upon a "symmetrical loading" technique is also disclosed.

The invention consists in the novel parts, constructions, arrangements, combinations and improvements herein shown and described.

For achieving automatic gain of some stage or system, a circuit is frequently employed which receives an alternating input signal of variable amplitude and derives a resultant output voltage whose amplitude is dependent on the amplitude of the alternating input voltage. The output voltage is then fed to a controlling element and is utilized to maintain some parameter of the controlled system at a constant value.

In a straight detection type operation the input is a modulated carrier and the output is principally the modulation which is ultimately used to obtain data. Circuits utilized for control purposes are found in communication equipment where a constant-amplitude received signal or transmitted signal is desired. They also find application in certain control systems where a stabilizing feedback voltage is converted to a constant polarity variable amplitude voltage for the purpose of regulating the transfer function of the system.

The detection type circuits have well-known application in a host of equipment.

While circuits of these types have performed adequately they are burdened by defects in their response characteristics which have origins in the fact that multiple resistance-reactance combinations and nonsymmetrical charge-discharge paths are found in the circuit arrangement. The multiplicity of resistance-reactance combinations in one instance involves an RC circuit associated with the input coupling and another RC circuit associated with the output filtering combination. The input coupling is associated with the isolation of A.C. and D.C. components which result from actual D.C. potentials and currents and from D.C. resistance in the signal source. The ill effect of this plurality of RC combinations is related to the fact that the response of an RC circuit of simple time constant is adversely modified, insofar as response time is concerned, by the addition of another RC circuit. The resultant multiple configuration provides a response to abrupt changes in amplitude of the input signal which is poorer than that attained by a simple time constant circuit. As a consequence, a rapid response in the output is not obtained. The importance of this effect is frequently overlooked or not appreciated.

The defect related to nonsymmetrical charge-discharge paths produces a nonsymmetrical response, the output responding to changes in input in different manners which depend on the direction of change of input.

It is thus an object of the invention to circumvent the disadvantages described above by providing a circuit which has a simple time constant and symmetrical response.

It is a further object of this invention to provide a circuit of the type disclosed which achieves a simple time constant characteristic and symmetrical response with a minimum of components arranged in a simple configuration.

Other objects and advantages of the invention will be set forth in part hereinafter and in part will be obvious herefrom or may be learned by practice with the invention, the same being realized and attained by means of the instrumentalities and combinations pointed out in the appended claims.

In the illustrations:

Figure 1:
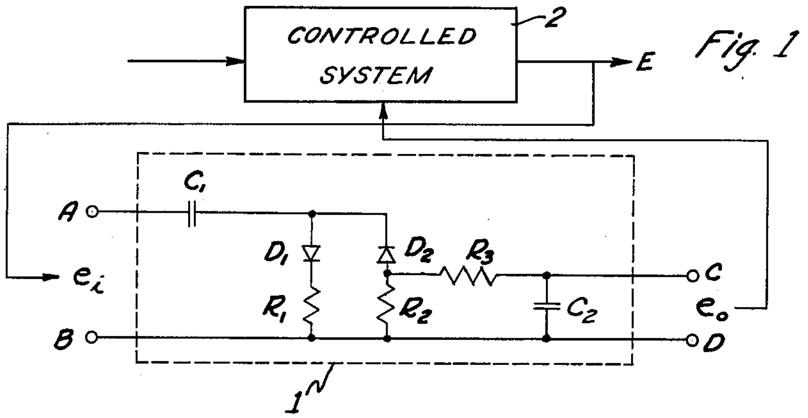
FIG. 1 is a schematic diagram of one embodiment of the invention useful for automatic control.

One embodiment illustrating the invention is shown in FIG. 1. An input $e_i$ is applied to the control circuit 1. Input $e_i$ is generally some fraction of the output E of the controlled system 2 although it may bear some other relation to E. Input $e_i$ in this illustration can be considered as a composite of A.C. and D.C. signals.

The output, $e_o$, of the control circuit 1 is generally applied to a controlling element of system 2. It may for example be applied as a controlling bias to one or more variable gain stages in the system. It is desirable that this output, $e_o$, respond as rapidly and symmetrically as possible to variations in the input $e_i$ so that correction of system 2 is accomplished in minimum time. Circuit 1 has therefore been designed to exhibit simple time constant, symmetrical properties.

The operation of circuit 1 can be understood by first noting its overall function. The input $e_i$, a variable amplitude A.C. signal ($e_{ac}$) superimposed on a substantially constant D.C. signal ($e_{dc}$) is applied at terminals A–B. The output, $e_o$, is a D.C. signal whose amplitude is designed to vary in accordance with the amplitude of the input A.C. component, $e_{ac}$.

Due to the cooperation of capacitor $C_1$, diodes $D_1$ and $D_2$ and resistors $R_1$ and $R_2$, there is presented to $e_{ac}$ an impedance which depends on $R_1$ and $R_2$. Capacitor $C_1$ has a low impedance at the frequencies of interest and since $R_1=R_2=R$, this impedance is approximately equal to the value R. The D.C. component of input, $e_{dc}$, is presented with a substantially infinite impedance since capacitor $C_1$ will ultimately charge to an average value equal to $e_{dc}$. Thus the A.C. component of input is operatively coupled into circuit 1 while the D.C. component is in effect rejected.

Considering now the voltage across $R_2$ in series with $D_2$: this voltage is of half-wave-rectified form. The time constant $R_2C_1$ is long compared to the period of $e_{ac}$. Time constant $R_3C_2$ is considerably longer however and $R_3$ is much larger than $R_2$ so that the combination of $R_2$ and $D_2$ can be deemed to produce this half-wave-rectified signal independently of the presence of $R_3$ and $C_2$.

In order to modify the pulsating D.C. signal across $R_2$ so as to place it in suitable form, the filtering combination $R_3C_2$ is employed. $R_3$ and $C_2$ are in a well-known configuration and provide filtering of the pulsating component so as to minimize the component occurring at the signal frequency. Appearing at output terminals CD is a D.C. output of amplitude which depends on $e_{ac}$—it is fed to system 2 and utilized as a controlling parameter. The outstanding and novel features of circuit 1 include its simple time constant characteristic and its symmetrical response. The response of $e_o$ relative to $e_{ac}$ depends primarily and substantially on the time constant $R_3C_2$.

To realize this fact recall that the combination of two diodes $D_1$ and $D_2$ and their equal series load resistances $R_1$ and $R_2$ results in the presenting of a net linear impedance to the A.C. component of input signal $e_{ac}$. Because of this "symmetrical loading" of $e_{ac}$, the coupling capacitor $C_1$ retains no sustained charge attributable to $e_{ac}$. As far as $e_{ac}$ is concerned, $C_1$ alternately charges and discharges through $D_1$ and $D_2$ and thus plays no part in the time constant relating $e_o$ with $e_{ac}$. Viewed alternately, any change in the amplitude of $e_{ac}$ produces a corresponding change across $R_1$ and $R_2$ without an intervening lag such as one associated with the charging and discharging of coupling capacitors (the counterparts of $C_1$) which are found in such circuits as peak rectifiers.

Besides simple time constant behavior, circuit 1 exhibits a substantially symmetrical transient response. The principal transient-determining components are $R_3$ and $C_2$. The charge and discharge times of $C_2$ are substantially equal—an increased voltage across $R_2$ causes $C_2$ to charge through a resistance approximately equal to $R_3$—a decreased voltage across $R_2$ causes $C_2$ to discharge through substantially the same resistance. This feature provides a symmetrical response. An evaluation of presently known circuits discloses nonsymmetrical response. In the case of a change in input signal amplitude these circuits exhibit two different time constant which depend on the direction of change of input. In one case the conduction path is through some diode for example, the path having a relatively short time constant. In the event of a change in the opposite direction conduction is through some resistance which in combination with C has a substantially larger time constant. This defect is absent in applicant's device.

Figure 2:
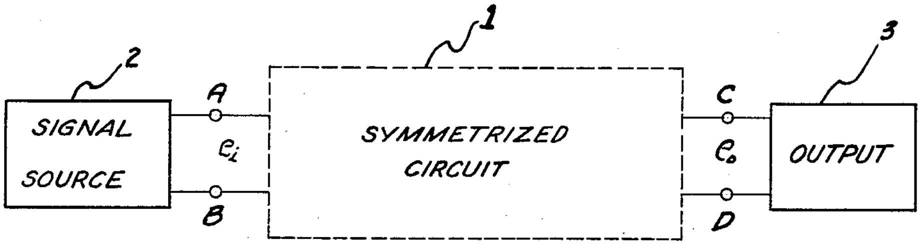
FIG. 2 is a schematic diagram disclosing the same embodiment functional in a detection operation.

The application of circuit 1 to a detection, demodulation or similar function is shown in FIG. 2. Circuit values are selected in a well-known manner in accordance with the frequencies and voltage amplitudes applied at input terminals A–B and those desired at output C–D. The signal to be detected originates in circuit 2 while the output is coupled to circuit 3.

The principles disclosed herein and illustrated in circuit 1 can be exploited by configurations which, though superficially different from the circuit, are fundamentally the same. Through the use of equivalence and duality, equivalent circuits can be constructed. Thus other unilateral operators may be substituted for diodes $D_1$ and $D_2$. It is also clear that $R_3$ and $C_2$ can be connected across $R_1$ instead of $R_2$ without changing circuit operation, the only difference being a reversal in the polarity of output voltage, $e_o$. Isolating elements equivalent in operation to $C_1$ may similarly be employed. A filter other than $R_3C_2$ can be utilized, the equivalence in this case being established by manifold configurations and components. It is also clear that the invention may be employed for either one of its novel properties alone and may also be used where a composite of signals of differing frequencies is applied. Proper adjustment of the circuit constants makes it applicable to AF, RF, video, and the higher frequency ranges. By way of illustrating generally the scope and nature of the invention a generalized configuration is shown in FIG. 3.

Figure 3:
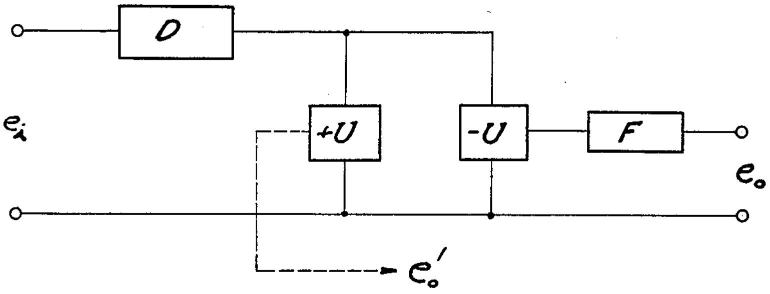
FIG. 3 is a schematic functional diagram illustrating the principles of the invention.

In FIG. 3 the input signal $e_i$ is a composite of two components. Circuit D functions to isolate one component. Circuits +U and −U provide oppositely polarized unilateral transmission characteristics to the other component. An output is taken from −U but may be taken alternately or in addition from +U. A filter, F, may or may not be required in accordance with the desired output. For deriving pulses varying in accordance with the input, a filter as such would not be required.

What is claimed is:

1. In combination with a modulated signal circuit a circuit for selecting the modulating component comprising a pair of unilateral means each responsive respectively to one polarity of the output of said modulated signal circuit, each of said unilateral means having substantially equivalent electrical load characteristics, and filtering means including reactance responsive to the output of one of said unilateral means, said other unilateral means comprising a dummy load and said filtering means providing an output related to said modulating component.

2. A demodulator circuit responsive to the alternating component of a composite electrical signal of direct and alternating components comprising rejection means which transmit said alternating component and reject said direct component, a pair of unilateral networks oppositely polarized and responsive to the output of said rejection means, said networks having substantially similar electrical load characteristics, coupling means including reactance responsive to the output of one of said unilateral means said coupling means providing an output related to said alternating component of said composite electrical signal.

3. A device according to claim 2 in which said rejection means is a capacitor and each of said unilateral networks includes a rectifier and resistance.

4. A device according to claim 2 which is adapted for connection to a source of said composite electrical signal and in which said rejection means is a capacitance connected in series with the source of said composite electrical signal, each of said unilateral networks includes a series combination of rectifier and resistance, said networks having substantially similar impedance values, said unilateral networks being connected in series with said capacitance and in shunt with said source of composite electrical signal.

5. In combination with an amplitude detection circuit having an input, a unilateral transmission network and a reactive decoupling circuit in responsive interconnection with said network, means for providing a simple time constant and symmetrical transient response comprising a second unilateral transmission network of opposite polarity with respect to said first unilateral transmission network, said second transmission network comprising a dummy load on said detection circuit and being connected effectively in parallel with said first transmission network.

6. A simple time constant detector circuit responsive to amplitude variations in a composite electrical signal said detector circuit having input and output connections and means comprising first and second unilateral transmission networks, said networks being oppositely polarized and having an effective resistive characteristic, and coupling and filtering means in responsive interconnection with one of said networks said other network comprising a simulated load.

7. A symmetrically responsive circuit selectively responsive to alternating components of a composite alternating and direct current electrical signal said circuit comprising rejecting means responsive to said electrical signal for rejecting the direct current component thereof, a first unilateral means responsive to one polarity of said alternating current component, a second unilateral means responsive to the other polarity of said alternating current component, said first and second unilateral means having related electrical properties which conjointly constitute a substantially symmetrical load, and output coupling means responsive to said first unilateral means and including filter means.

8. A device according to claim 7, in which one of said unilateral means comprises a dummy simulated load for said circuit.

9. A device according to claim 7, in which said first and second unilateral means are connected effectively in parallel and each comprises a substantially resistive load.

10. In combination with an automatic control system, a circuit responsive to fluctuations in the controlled parameter comprising frequency selective means responsive to said controlled parameter, a pair of unilateral means effectively coupled to said frequency selective means, one of said unilateral means comprising a dummy load and being responsive to one polarity of the signal resulting from said frequency selective means and the other of said unilateral means being responsive to the opposite polarity of signal resulting from said frequency selective means, said first and second unilateral means having electrical characteristics related according to the requirement that the net load represented by said first and second means be symmetrical, and frequency selective coupling means responsive to the output of said other unilateral means said coupling means providing an output which is functional in controlling said controlled parameter.

11. In demodulator circuits having an input and means coupled thereto comprising unilateral means, reactive filter means coupled thereto and load means, simulated load means for providing said circuits with simple time constant and symmetrical response comprising second unilateral means polarized oppositely with respect to said first-mentioned unilateral means and connected in circuit with said first-mentioned unilateral means to function alternatively with said first-mentioned unilateral means, said second unilateral means having a load characteristic substantially equivalent to the load characteristic of said load means.

12. Apparatus according to claim 11, in which said second unilateral means comprise a rectifier and dissipative means, said second unilateral means being oppositely polarized with respect to said first-mentioned unilateral means and being connected effectively in parallel with the series combination of said first-mentioned means and said load means.

References Cited in the file of this patent

UNITED STATES PATENTS

| | | |
|---|---|---|
| 2,603,779 | Ferrill | July 15, 1952 |
| 2,675,473 | Femmer | Apr. 13, 1954 |
| 2,771,549 | Viterisi | Nov. 20, 1956 |
| 2,838,666 | Teer | June 10, 1958 |
| 2,854,570 | Broverman | Sept. 30, 1958 |